(No Model.)

H. E. ATTEBERRY.
CONVERTIBLE MEASURE.

No. 575,020. Patented Jan. 12, 1897.

Witnesses,
Wm. W. Deutsch
W. Q. Olden.

Inventor,
Henry E. Atteberry
By Atty. N. DuBois,

UNITED STATES PATENT OFFICE.

HENRY E. ATTEBERRY, OF SPRINGFIELD, ILLINOIS, ASSIGNOR OF ONE-HALF TO GEORGE M. BENNETT, OF SAME PLACE.

CONVERTIBLE MEASURE.

SPECIFICATION forming part of Letters Patent No. 575,020, dated January 12, 1897.

Application filed March 30, 1896. Serial No. 585,377. (No model.)

*To all whom it may concern:*

Be it known that I, HENRY E. ATTEBERRY, a citizen of the United States, residing at Springfield, in the county of Sangamon and State of Illinois, have invented a certain new and useful Convertible Measure, of which the following is such a full, clear, and exact description as will enable those skilled in the art to which it appertains to make and use my said invention.

The purposes of my invention are to provide a measure consisting of two members so constructed and arranged as to be adjustable relative to each other and so constructed and arranged that one of said members independently of each other will alone contain a predetermined quantity, as, for instance, a peck, of any measurable commodity, and the two parts in conjunction will contain double the quantity; to provide means for so connecting said members that when they are in adjustment for the measurement of the smaller quantity the smaller of said members will lie within the larger and when they are in adjustment for the measurement of the larger quantity they will be held in firm contact with each other in such position as to form one continuous measure having for its bottom the bottom of the smaller member; to provide simple and effective means for pivotally connecting the smaller member with the larger member in such manner that the position of the former relative to the latter may be reversed, as hereinafter set forth; to provide a simple and effective clamping device, and to provide simple and effective means to prevent transverse displacement of the members, as hereinafter set forth.

With these ends in view my invention consists of certain novel features of construction and combinations of parts shown in the annexed drawings and hereinafter particularly described and specifically claimed.

Figure 1:
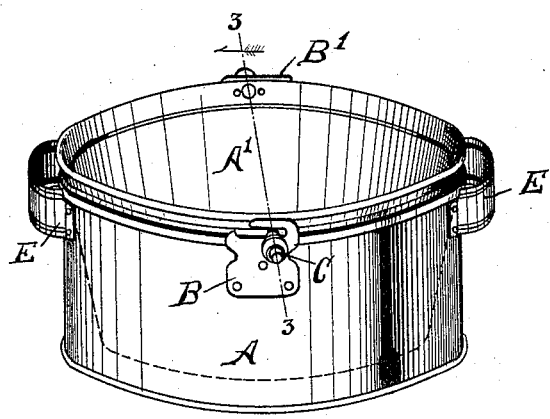
Figure 4:
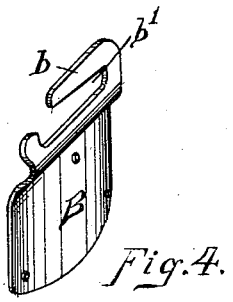
Figure 3:
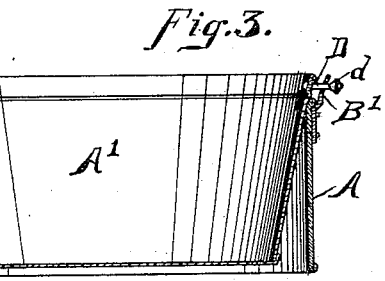
Figure 6:
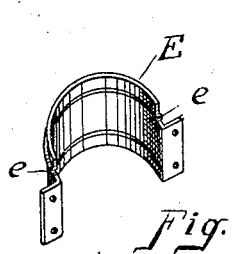
Figure 2:
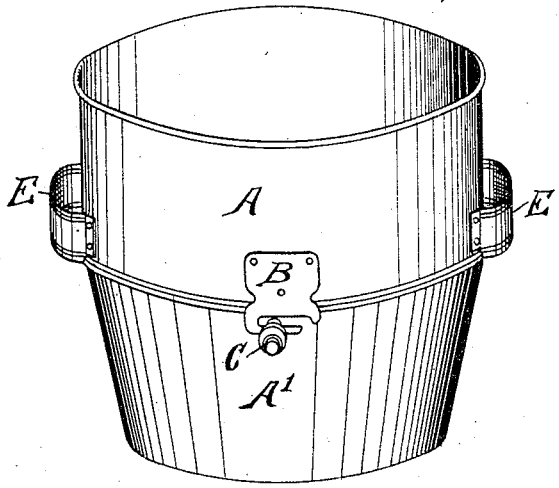
Figure 5:
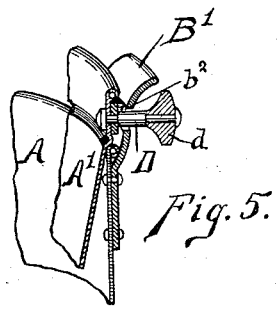

Referring to the annexed drawings, Figure 1 is a perspective view of the complete device in its contracted form, as used in the measurement of the smaller quantity. Fig. 2 is a perspective view of the complete device in its elongated form, as used for the measurement of the larger quantity. Fig. 3 is a vertical longitudinal section on the line 3 of Fig. 1. Fig. 4 is an enlarged detached perspective view of the clamping-plate. Fig. 5 is an enlarged combined perspective and sectional view of the pivot-plate and pivot and shows the antifriction-roller on said pivot. Fig. 6 is an enlarged detached perspective view of one of the handles.

Similar letters of reference designate like parts in all of the views.

The measure in its entirety consists of two members connected with each other, as hereinafter set forth. The larger member A is cylindrical in form and without a bottom. The smaller member A' is in the form of a frustum of a cone, the bottom being in the smaller end thereof. The member A' fits closely within the member A. The clamping-plate B is secured in any suitable manner to the outside of the member A near its upper edge, and the pivot-plate B', which is curved to conform to the surface of the member, is similarly secured to the member A' diametrically opposite to the plate B, as clearly shown in Figs. 1 and 3. The clamping-plate B is curved to conform to the periphery of the member A and has an integral finger $b$, the lower edge of which tapers slightly downward from the point to the base of the finger, so as to form an inclined surface with which the stem of the knob C engages, so as to clamp the parts together, as hereinafter set forth.

The knob C is secured in any suitable manner to the outside of the member A' near its upper edge and has a stem which fits snugly in the fork $b'$ in the plate B. The knob is placed in such position on the member A' that when the members A and A' occupy the positions shown in Figs. 1 and 3 the stem of the knob will press firmly against the under surface of the finger $b$, so as to hold the periphery of the member A' in close contact with the upper edge of the member A, and when the members occupy the position shown in Fig. 2 the contiguous edges of the members will be retained in close contact with each other.

In the plate B' is a slightly-tapering slot $b^2$, in which the pivot turns and slides. The slot $b^2$ inclines in a direction opposite to the inclination of the inclined surface of the finger $b$, in order that when the knob C is moved in such direction as to wedge the stem of the knob in the fork $b'$ the pivot may be slid in the opposite direction to wedge the pivot in the slot, and when the movement of the knob is reversed and its stem thereby released from engagement with the finger $b$ the pivot may be slid in the slot $b^2$ to release the pivot.

The pivot D is secured in any suitable manner to the outside of the member A' and diametrically opposite to and in line with the knob C. At the outer end of the pivot D is a roller $d$, which serves to reduce friction between the parts when the member A' is raised out of the member A and turned on the pivot, so as to bring the members into the relative positions shown in Fig. 2.

The handles E (clearly illustrated in Fig. 6) are of the usual well-known form, except that they have at each end an upwardly-extending ledge. The handles E may be secured to the member A in any suitable manner, and when they are in position on the member A the ledges $e$ extend somewhat above the rim of the member A and serve to prevent lateral displacement of the member A' with respect to the member A.

The operation of the device is as follows: When the members are in the relative positions shown in Fig. 1, the measure is in the proper adjustment for the measurement of the smaller quantity, say one peck. In order to change the adjustment so as to adapt the measure for the measurement of the larger quantity, say a half-bushel, it is only necessary to slide the knob C and the pivot D so as to withdraw the stem of the knob from the fork $b'$ and free the pivot from binding contact in the slot $b^2$. The member A' is then raised by means of the knob C sufficiently to permit the lower edge of the member A' to turn clear of the upper edge of the member A. The member A' is then turned one-half revolution on the pivot D to bring the upper edge of the member parallel to and in contact with the upper edge of the member A, so that the rim of the member A will rest in contact with the ledges $e$ on the handles E in such manner as to prevent transverse displacement of the member. The member A' is then turned horizontally by means of the knob C and the pivot D sufficiently to cause the stem of the knob to wedge in the fork $b'$ and the pivot to wedge in the slot $b^2$ in such manner as to connect the members firmly together. The united members are then turned so as to bring the measure into the position shown in Fig. 2, and the conversion of the measure from a peck-measure into a half-bushel measure is completed.

To change the measure from a half-bushel measure to a peck-measure, the operation which I have just described is reversed.

I have throughout this description as a matter of convenience referred to the lesser measure as a peck and the greater or converted measure as a half-bushel. I do not, however, confine myself to a measure having these precise relative capacities, since it is obvious that measures of different capacities may be used without departing from the spirit of or sacrificing any of the advantages of my invention, it being only essential that the different members shall be of such relative dimensions that the capacity of the converted or greater measure shall be complemental of the capacity of the lesser measure.

Having fully described my invention, what I claim as new, and desire to secure by Letters Patent, is—

1. In a convertible measure, the combination of a member having handles provided with ledges, and a revoluble member connected with said first-named member and adapted to abut against the ledges on said handles, as set forth.

2. In a convertible measure, the combination of a bottomless member; handles having ledges and secured to said member; a clamping-plate and a pivot-plate secured to said member; a bottom member fitting in said bottomless member; and a knob and a pivot secured to said bottomed member, and adapted to work in said clamping-plate and pivot-plate respectively, as set forth.

3. In a convertible measure, a pivot provided with a roller, and a curved and slotted pivot-plate on which said roller turns, in combination with a revoluble member to which said pivot is secured; a complemental member with which said revoluble member is connected; and means adapted to clamp said members together; as set forth.

In witness whereof I have hereunto subscribed, at Springfield, Illinois, this 12th day of March, 1896.

HENRY E. ATTEBERRY.

Witnesses:
GEORGE M. BENNETT,
D. A. DE VARES.